United States Patent [19]

Kime

[11] E Patent Number: Re. 33,548

[45] Reissued Date of Patent: Mar. 5, 1991

[54] DEVIATION CORRECTION APPARATUS FOR OPTICAL DISC LIGHT BEAMS

[75] Inventor: Kenjiro Kime, Nagaokakyo, Japan

[73] Assignee: Mitsubishi Denki Kabushiki Kaisha, Tokyo, Japan

[21] Appl. No.: 169,913

[22] Filed: Jan. 21, 1988

Related U.S. Patent Documents

Reissue of:

[64] Patent No.: 4,566,089
Issued: Jan. 21, 1986
Appl. No.: 589,914
Filed: Mar. 15, 1984

[30] Foreign Application Priority Data

Mar. 30, 1983 [JP] Japan ..... 58-57378
Jun. 6, 1983 [JP] Japan ..... 58-100421

[51] Int. Cl.[5] ..... G11B 7/08
[52] U.S. Cl. ..... 369/44.21; 350/255
[58] Field of Search ..... 369/44, 45, 46, 112, 369/44.21; 350/245, 247, 255, 6.3; 250/201 DF

[56] References Cited

U.S. PATENT DOCUMENTS

| | | | |
|---|---|---|---|
| 4,135,206 | 1/1979 | Kleuters et al. | 369/44 |
| 4,193,091 | 3/1980 | Kleuters et al. | 369/44 |
| 4,462,096 | 7/1984 | Xusaka . | |
| 4,467,463 | 8/1984 | Yano | 369/45 |
| 4,473,274 | 9/1984 | Yano et al. | 350/255 |
| 4,482,988 | 11/1984 | Tsurushima et al. | 369/45 |
| 4,504,935 | 3/1985 | Jansen | 369/45 |
| 4,664,476 | 5/1987 | Kasuga . | |

FOREIGN PATENT DOCUMENTS

| | | | |
|---|---|---|---|
| 0057070 | 8/1982 | European Pat. Off. . | |
| 2493017 | 10/1981 | France . | |
| 8120087 | 4/1982 | France . | |
| 55-117745 | 9/1980 | Japan . | |
| 57-74836 | 5/1982 | Japan . | |
| 57-120240 | 7/1982 | Japan . | |
| 57-179955 | 11/1982 | Japan . | |
| 57-198548 | 12/1982 | Japan . | |
| 59-98850 | 6/1983 | Japan | 369/45 |
| 8301430 | 11/1983 | Netherlands . | |
| 1133480 | 11/1968 | United Kingdom . | |

OTHER PUBLICATIONS

Patent Abstracts of Japan, vol. 7, No. 26 (P-172) [1171], Feb. 2, 1983; & JP-A-57 179 955 (Nippon Victor K.K.) 05-11-1982.

Patent Abstracts of Japan, vol. 7, No. 51 (P-179) [1190], Feb. 26, 1983; & JP-A-57 198 518 (Nippon Victor K.K.) 06-12-1982.

*Primary Examiner*—Donald McElheny, Jr.
*Attorney, Agent, or Firm*—Sughrue, Mion, Zinn, Macpeak and Seas

[57] ABSTRACT

A laser beam 11 focused to a spot 12 by an objective lens 30 for following an information track 24 on a video disc is subject to three mutually orthogonal deviations; lateral or tracking, focus, and time axis or jitter. To correct these the lens is mounted in a second holder 9, in turn flexibly mounted by spring strips 13a, 13b to a first holder 1, in turn rotatably and slidably mounted to a base 4 by a shaft and bearing 3, 2. Various permanent magnets 7, 10 and coils 5, 6, 8 cooperable therewith are disposed such that selected coil energizations move the lens relative to the information track to correct any detected deviations.

23 Claims, 4 Drawing Sheets

DEVIATION CORRECTION APPARATUS FOR OPTICAL DISC LIGHT BEAMS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a drive apparatus for an optical disc player or recorder, such as a video disc digital audio player, for controlling and tracing the read-out light spot on the disc to record or regenerate information without mechanical disc contact.

2. Description of the Prior Art

In general, it is necessary to control and trace the read-out light spot in accordance with the detected amount of three mutually orthogonal deviations, namely focusing deviation of the light spot perpendicular to the disc surface, tracking deviation of the light spot in a direction perpendicular to both the optical axis and the information track on the disc, and time-axis deviation (jitter) in the direction of the information track.

FIG. 1 shows a conventional optical video disc player apparatus, including a focus control device 21 comprising an objective lens 30 and a magnetic coil Co for driving the lens, both disposed facing a disc (not shown) and a tracking control device 22 comprising a reflection mirror 20a and a magnetic coil Cra for rotatably driving the mirror about a transverse or diametrical axis. A jitter control device 23 comprising a reflection mirror 20b and a magnetic coil Crb for rotatably driving the mirror 20b is also provided.

In operation, a read-out beam 11 emitted from a light source (not shown) is reflected by the mirrors 20b and 20a, and impinges on the information track 24 of the disc after passing through the lens 30 of the focus control device 21.

Since a video disc rotated at a high speed, such as 1800 rpm, focus, tracking, and jitter deviations are produced by the swing, eccentricity and rotational nonuniformity of the disc. To compensate for these deviations the objective lens 30 is controlled in the direction of arrow G parallel to the optical axis, the mirror 20a is controlled in the direction of arrow H transverse to the information track, and the mirror 20b is controlled in the direction of arrow I parallel to the information track so that the light spot can precisely read out the information on the track. In effecting these controls the objective lens 30 is moved or driven in the direction of arrow L by the coil Co, mirror 20a is rotated in the direction of arrow K by coil Cra, and mirror 20b is rotated in the direction of arrow J by coil Crb.

Since in this apparatus the focus, tracking and jitter control devices 21, 22 and 23 are mechanically and physically separated from each other, miniaturization is difficult. Additionally, as the light spot, the optical axis of which is oblique, enters the objective lens 30, a sufficient correction for or control of aberration is necessary. Further, since the mutual geometrical and optical relationship between the light beam 11 and the objective lens 30 is adversely influenced by the rotations of the mirrors 20a, 20b, the light beam does not proceed in the appropriate direction towards the objective lens and consequently the optical performance of the latter is diminished.

SUMMARY OF THE INVENTION

An object of this invention is to provide a miniaturized apparatus for easily controlling and tracing a light beam of an optical disc player or recorder with a high degree of accuracy.

This object is implemented by a compact apparatus combining rotational, thrust and parallel driving means in a unitary assembly for correcting tracking, focus and jitter deviations, respectively, in a mutually orthogonal manner.

DETAILED DESCRIPTION OF THE PREFERRED EMBODIMENTS

Figure 1:
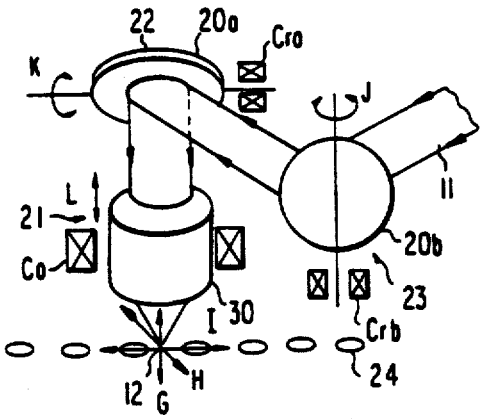
FIG. 1 is a conceptual view of a conventional control/driving apparatus.
Figure 2:
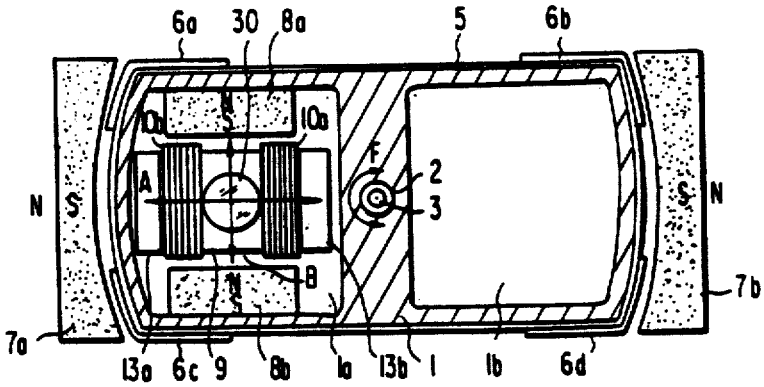
FIG. 2 is a plan view of a first embodiment of the tridimensional control/driving apparatus of this invention.
Figure 3:
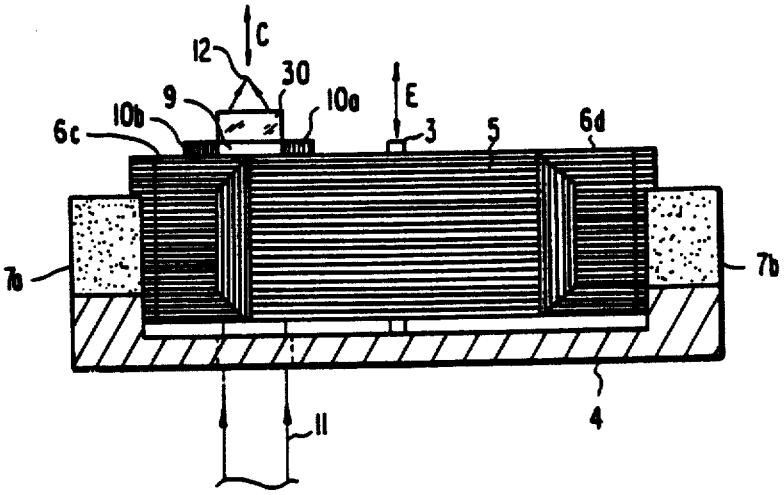
FIG. 3 is a side view of FIG. 2.
Figure 4:
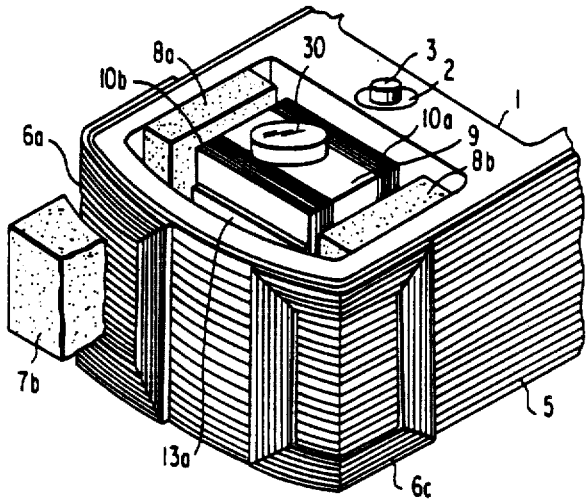
FIG. 4 is a perspective view of a portion of FIG. 2.

As shown in FIGS. 2 and 3, a cylindrical bearing 2 is located at the center portion of a holder 1 which has two concave recesses 1a, 1b flanking the bearing and circularly curved end surfaces. A shaft 3 is fixed to a base 4 as shown in FIG. 3 and stands upright inside the bearing 2 with a clearance ranging from several um to several decades of um to enable free rotation and sliding. The surfaces of the bearing and/or shaft are coated with a resin such as Teflon having a low frictional coefficient. A first coil 5 for focus control is wound around the outside of the rectangularly shaped holder 1. Second coils 6a, 6b, 6c, 6d for tracking control are attached over the coil 5 at each corner of the holder. First permanent magnets 7a, 7b with curved inner surfaces for focus and tracking control are provided at the ends of the base 4 opposite the first and second coils. Second permanent magnets 8a, 8b for jitter control are disposed in the recess 1a.

Figure 5:
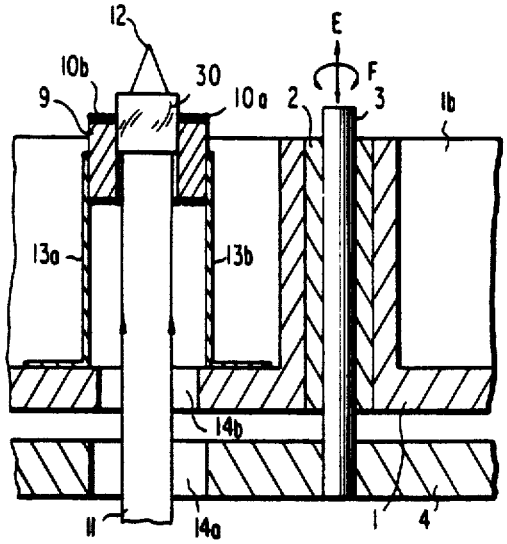
FIG. 5 is a partial cross-sectional view showing the relation between a shaft and a bearing of FIG. 2.

A holder 9 for the objective lens 30 is located between the jitter control magnets, and third coils 10a, 10b for jitter control are wound around the holder on both sides of the objective lens. The holder 9 is mounted between the ends of a pair of parallel plate support springs 13a, 13b made of phosphor bronze as shown in FIG. 5.

The holder 1 and the base 4 have respective holes 14a, 14b (FIG. 5) through which the light beam 11 passes; it is focused to a light spot 12 by the objective lens. The holder 1 is supported by the shaft 3 fixed to the base 4, and can both rotate in the direction of arrow F and slide in the direction of arrow E.

The holder 1, the bearing 2, the shaft 3, the second coils 6a–6d and the first permanent magnets 7a, 7b form a rotation driving means, by means of which the lens holder 9 and objective lens 30 may be rotated to correct any track deviation of the read-out spot 12.

The holder 1, the bearing, the shaft, the first coil 5 and the first permanent magnets 7a, 7b form a thrust driving means for moving the lens 30 in the direction of the optical axis to correct any focus deviation.

The support springs 13a, 13b, the third coils 10a, 10b and the second permanent magnets 8a, 8b form a parallel driving means for moving the lens in the direction of the information track (arrow A in FIG. 6) to correct any jitter deviation.

In operation, when a tracking deviation of the light spot 12 perpendicular to both the optical axis and the information track is detected, a current of appropriate polarity proportional to the detected deviation is supplied to the coils 6a–6d to rotate the holder 1 about the shaft 3 in the direction of arrow F in cooperation with the magnets 7a, 7b, thus correcting such tracking deviation.

Similarly, when a focus deviation is detected, a current of appropriate polarity proportioned thereto is supplied to the coil 5 to drive the holder 1 and thus the lens 30 in the direction of arrow E in cooperation with the magnets 7a, 7b, thereby correcting such focus deviation.

The objective lens 30 is thus driven and controlled in both the focus controlling direction shown by arrow E in FIG. 3 and in the rotation controlling direction shown by arrow B in FIG. 2.

Figure 6:
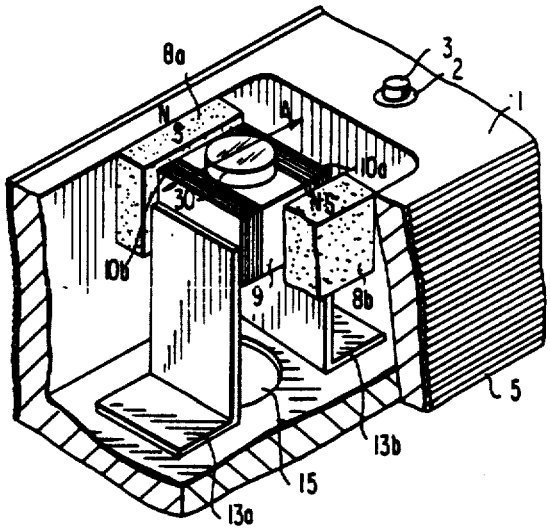
FIG. 6 is a cutaway perspective view showing a support means and a driving means for an objective lens of FIG. 2.
Figure 7:
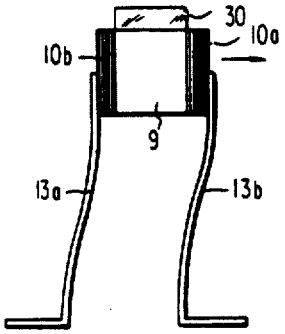
FIG. 7 is a side sectional view showing the operation of the objective lens of FIG. 2.

When a time-axis or jitter deviation in the direction of the information track is detected, a current of appropriate polarity proportional thereto is supplied to the coils 10a, 10b, to drive the lens holder 9 and the objective lens 30 in the direction of arrow A in FIGS. 6 and 7 in cooperation with the magnets 8a, 8b to thereby correct such jitter.

The means for detecting the three deviations and for generating the appropriate coil correction signals in response thereto are not shown as they are fully conventional and form no part of the invention.

In the foregoing it is assumed that the information track runs parallel to the longitudinal axis of the holder 1, but it could also run transverse thereto in which case arrow A would represent the tracking correction direction and arrow B the jitter direction.

In the tri-axial operation of this embodiment the objective lens 30 is movable in the direction of arrow A by the bending of the parallel support springs 13a, 13b as shown in FIG. 7, whereby the optical axis of the objective lens is maintained substantially parallel to that of the light beam 11 and the latter is always kept substantially perpendicular to the surface of the disc (not shown).

As the distance or spacing between the magnets 7a, 7b and the coils 5, 6a, 6b, 6c, 6d and between the magnets 8a, 8b and the coils 10a, 10b is always substantially constant, the lens holder 9 can be stably shifted to implement deviation corrections by symmetrical and highly-balanced driving forces. To operate the apparatus with a high degree of precision using small driving forces, light weight plastic magnets may be employed as the magnets 8a, 8b fixed to the holder 1. To miniaturize these it is desirable that the objective lens 30 be small and light weight, and a plastic or Frenel lens would thus be suitable.

Figure 8:
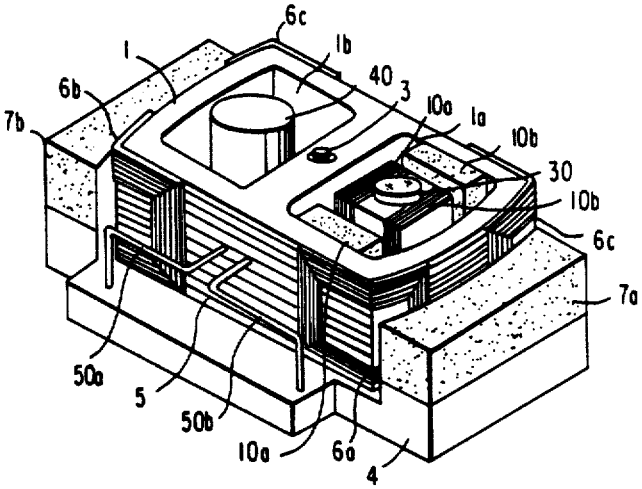
FIG. 8 is a perspective view showing a second embodiment of the invention.
Figure 9:
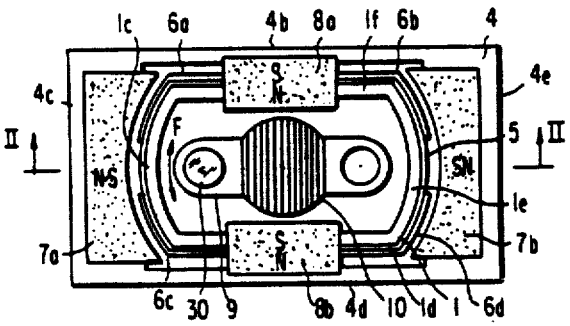
FIG. 9 is a plan view showing a third embodiment of the invention.
Figure 10:
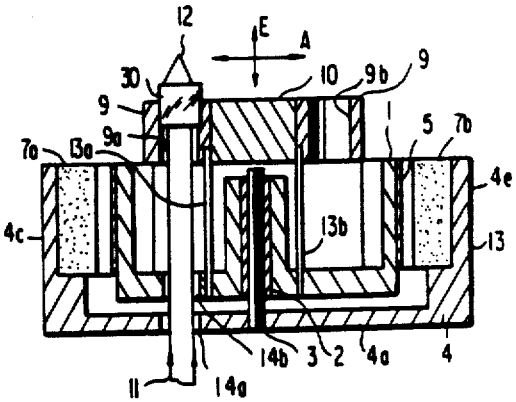
FIG. 10 is a cross-sectional view at line X—X in FIG. 9.
Figure 11:
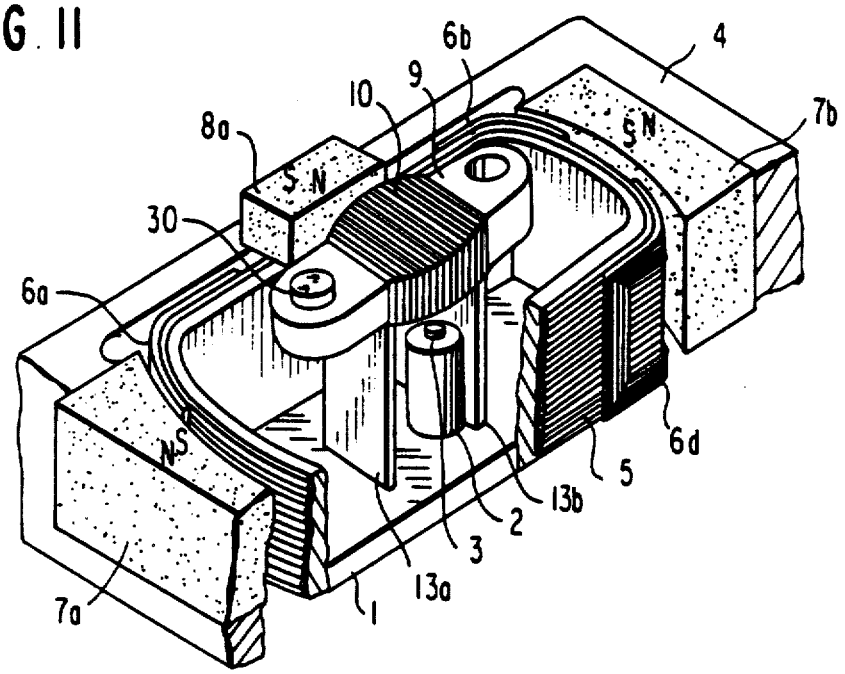
FIG. 11 is a cutaway perspective view of FIG. 9.
Figure 12:
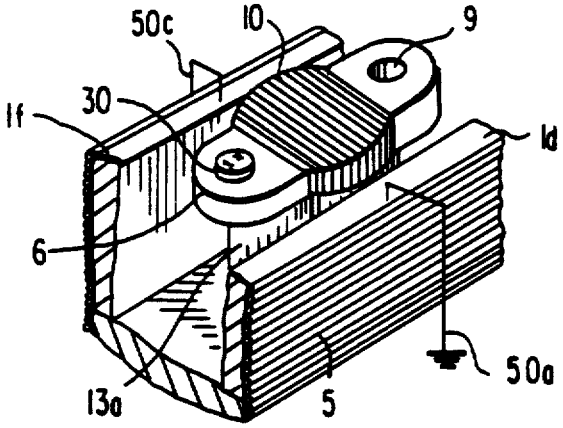
FIG. 12 is a partial perspective view of FIG. 9.

Another embodiment is shown in FIG. 8, wherein a counter or balancing weight 40 is provided in the recess 1b of the holder 1 and flexible members 50a, 50b comprising metallic or rubber springs are provided between the side of the holder 1 and the base 4 to generate restoring forces in the tracking, jitter and focus directions. Owing to the weight 40 the holder 1 may rotate around the shaft 3 with a higher degree of balancing precision than in FIGS. 1–7.

Still another embodiment is shown in FIGS. 9–12 whose structure is essentially similar to that detailed above, the same reference numerals being used to designate the same or equivalent features. In this embodiment a box-like base 4 contains first permanent coils 7a, 7b fixed thereto and has five walls comprising a bottom wall 4a with a hole 14a, and side walls 4b, 4c, 4d, 4e. The holder 1 has only one recess 1a where the optical means is provided. Of the four side surfaces 1c–1f the two end surfaces 1c, 1e are circularly curved to mate with the inner curved surface of the magnets 7a, 7b, similar to the embodiments of FIGS. 1–8.

The holder 1 is again rotatably and slidably supported by a shaft 3 and a bearing 2, the top ends of which are below the bottom surface of the lens holder 9. Second permanent magnets 8a, 8b are attached to the top central side walls 4b, 4d of the base. The coil 10 is wound around the central portion of the lens holder 9 which has two protruding end portions with symmetrically formed holes 9a and 9b. Elastic restoration springs 50a, 50b (FIG. 12) may be fixed to the bottom wall 4a of the base at their one ends and to the top edges of the holder walls 1d, 1f at their other ends to establish the neutral points of the holder mounting within the base in the rotational and up-down directions.

The operation of this embodiment is similar to that of FIGS. 1–8, and exhibits improved mechanical balance and lighter weight.

In the foregoing embodiments optical disc players are disclosed, but this invention is equally adaptable to an optical disc recorder.

What is claimed is:

1. A driving apparatus for controlling and tracing light beams of an optical disc player or recorder, comprising:

(a) a base member (4), (b) a first holder member (1) slidably and rotably disposed on a shaft (3) upstanding from said base member, (c) optical means (30) for focusing a light beam (11) irradiated thereon and emitting said light beam as a light spot (12), (d) a second holder member (9) mounting said optical means, (e) means (13a,13b) for flexibly mounting said second holder member to said first holder member for movement towards and away from said shaft in a direction perpendicular thereto, (f) rotation driving means (6a–6d, 7a, 7b) for rotating said first holder member and optical means about said shaft to correct tracking deviations of said light spot transverse to an information track on a storage disc, (g) thrust driving means (5, 7a, 7b) for sliding said first holder member and optical means on said shaft to correct focus deviations of said light spot with respect to said information track, and (h) parallel driving means (10a,10b, 8a, 8b) for moving said second holder member and optical means perpendicular to said shaft to correct time axis or jitter deviations of said light spot.

2. An apparatus as claimed in claim 1, wherein said optical means comprises an objective lens.

3. An apparatus as claimed in claim 2, wherein said thrust driving means comprises first coil means (5) attached to said first holder member, and first permanent magnet means (7a, 7b) disposed opposite said first coil means.

4. An apparatus as claimed in claim 3, wherein said rotation driving means comprises second coil means (6a–6d) attached to said first holder member and said first permanent magnet means.

5. An apparatus as claimed in claim 4, wherein said parallel driving means comprises third coil means (10a, 10b) attached to said second holder member, and second permanent magnet means (8a,8b) disposed opposite said second permanent magnet means.

6. An apparatus as claimed in claim 5, wherein said first holder member is substantially rectangularly shaped and has convex surfaces at its opposite longitudinal ends, and said first permanent magnet means has concave surfaces opposite said convex surfaces.

7. An apparatus as claimed in claim 5, wherein said first magnet means is mounted on said base member, and said first holder member is connected to said base by elastic means providing restoring force to said holder member when out of a mechanical neutral position.

8. An apparatus as claimed in claim 5, wherein said first holder member has a recess (1a) in a body portion thereof, and said flexible mounting means is disposed in said recess.

9. An apparatus as claimed in claim 8, wherein said second permanent magnet means are attached to said base member (FIGS. 9–12).

10. An apparatus as claimed in claim 8, wherein said second holder member is rectangular shaped, said objective lens is mounted at a center portion thereof, and said third coil means are wound around opposite end portions of said rectangular holder member.

11. An apparatus as claimed in claim 8, wherein said objective lens is mounted at one end of said second holder member, and said third coil means are wound around a center portion of said holder member (FIGS. 9–12).

12. An apparatus as claimed in claim 8, wherein said second permanent magnet means are mounted to an inner surface of said first holder member recess.

13. An apparatus as claimed in claim 12 wherein said first holder member has two recesses (1a,1b) symmetrically provided in opposite halves thereof, and a balancing weight (40) is mounted in one of said recesses (FIG. 8).

14. An apparatus as claimed in claim 8, wherein said first coil means is wound around the entire outside surface of the first holder member.

15. An apparatus as claimed in claim 14, wherein said second coil means comprises four coils attached to corner portions of said first holder member over said first coil means.

*16. A driving apparatus for controlling and tracing light beams of an optical disc player or recorder, comprising:*

*(a) a base member (4),*

*(b) a holder member slidably and rotatably disposed on a shaft (3) upstanding from the base member,*

*(c) optical means (30) supported on said holder member for focusing a light beam (11) irradiated thereon and emitting said light beam as a light spot (12), said optical means being positioned on one side of said holder member in relation to said shaft,*

*(d) rotation driving means (6a–6d, 7a, 7b) for rotating said holder member and optical means about said shaft to correct tracking deviations of said light spot transverse to an information track on a storage disc,*

*(e) thrust driving means (5, 7a, 7b) for sliding said holder member and said optical means on said shaft to correct focus deviations of said light spot with respect to said information track,*

*(f) balancing means (40), positioned on the other side of said holder member in relation to said shaft, fordynamically stabilizing said holder member against undesirable movements during rotation and sliding of said holder member.*

*17. A driving apparatus as claimed in claim 16, wherein. said optical means and said balancing means are positioned symmetrically to each other with respect to said shaft.*

*18. A driving apparatus as claimed in claim 16, wherein: said holder member has two recesses (1a, 1b) symmetrically provided in opposite halves thereof, said balancing means is positioned in one of said recesses, and said optical means is positioned in the other of said recesses.*

*19. A driving apparatus as claimed in claim 16, further comprising:*

*restoration means (50-a, 50-b) for generating restoring forces for maintaining said holder member in a mechanically neutral position in the tracking and focusing directions, said restoration means being provided between said holder member and said base member.*

*20. A driving apparatus as claimed in claim 19, wherein: one end of said restoration means is fixed to the outside portion of said holder member and the other end of said restoration means is fixed to a fixing member.*

*21. A driving apparatus as claimed in claim 20, wherein: said fixing member is a portion of said base member.*

*22. A driving apparatus as claimed in claim 16, wherein: said rotation driving means and said thrust driving means are attached to said holder member.*

*23. A driving apparatus as claimed in claim 21, wherein: said holder member is substantially rectangular shaped.*

* * * * *